United States Patent
Barcelos

(10) Patent No.: US 10,539,458 B2
(45) Date of Patent: Jan. 21, 2020

(54) OPTICAL FLAME DETECTOR

(71) Applicant: Honeywell International Inc., Morris Plains, NJ (US)

(72) Inventor: Nathaniel Paul Barcelos, Eastsound, WA (US)

(73) Assignee: Honeywell International Inc., Morris Plains, NJ (US)

( * ) Notice: Subject to any disclaimer, the term of this patent is extended or adjusted under 35 U.S.C. 154(b) by 36 days.

(21) Appl. No.: 15/647,730

(22) Filed: Jul. 12, 2017

(65) Prior Publication Data

US 2019/0017865 A1    Jan. 17, 2019

(51) Int. Cl.
*G01J 1/02*    (2006.01)

(52) U.S. Cl.
CPC .................. *G01J 1/0271* (2013.01)

(58) Field of Classification Search
CPC ..... G08B 17/12; G08B 17/125; G08B 29/043
See application file for complete search history.

(56) References Cited

U.S. PATENT DOCUMENTS

| 6,364,026 B1 | 4/2002 | Doshay | |
| 2010/0139995 A1* | 6/2010 | Rudakevych | B62D 55/06 180/9.32 |
| 2015/0165895 A1* | 6/2015 | Menor | B60K 7/0007 701/23 |

FOREIGN PATENT DOCUMENTS

| CN | 205306899 U | 6/2016 |
| KR | 20090114876 A | 11/2009 |
| WO | 2013130954 A1 | 9/2013 |
| WO | 2016133735 A1 | 8/2016 |

OTHER PUBLICATIONS

Gary W. Hunter, Joseph R. Stetter, Peter J. Hesketh, Chung-Chiun Liu; Smart Sensor Systems; The Electrochemical Society Interface; 2010; pp. 29-34.
SparkFun 9DoF Sensor Stick—Sen-13944—SparkFun Electronics [retrieved Apr. 11, 2017]; Retrieved from the Internet: <https://www.sparkfun.com/products/13944>; 3 pages.
Europe Patent Application No. 18183153.8, Extended European Search Report, dated Dec. 7, 2018, 12 pages.

* cited by examiner

*Primary Examiner* — Thanh Luu
(74) *Attorney, Agent, or Firm* — Wick Phillips Gould & Martin, LLP; Jerry C. Harris, Jr.

(57) ABSTRACT

Embodiments relate generally to systems and methods for optically detecting a flame. A system may comprise an optical flame detector, wherein the optical flame detector comprises a magnetometer, an accelerometer, and a gyroscope; and an information handling system, wherein the information handling system is configured to obtain orientation data from the magnetometer, the accelerometer, and the gyroscope; wherein the orientation data comprises movement and/or vibration data; angular velocity data; and direction data.

12 Claims, 2 Drawing Sheets

OPTICAL FLAME DETECTOR

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

To prevent fires, the use of flame detectors may be incorporated into various environments, such as, for example, oil refineries, oil platforms/rigs, semiconductor fabrication plants, gas storage facilities, and/or power plants. These environments may require monitoring and an appropriate response to a fire or a potential fire situation. Flame detectors may detect a presence of a flame by sensing various spectral bands which may be emitted from the flame. Responses to a detected flame may include activating an alarm, shutting off a fuel line (e.g., a natural gas line), and/or triggering a fire suppression system.

SUMMARY

In an embodiment, an optical flame detector may comprise a magnetometer; an accelerometer; and a gyroscope; wherein the magnetometer, the accelerometer, and the gyroscope are configured to provide orientation data of the optical flame detector.

In an embodiment, a system for optically detecting a flame, the system comprising an optical flame detector, wherein the optical flame detector comprises a magnetometer, an accelerometer, and a gyroscope; and an information handling system, wherein the information handling system is configured to obtain orientation data from the magnetometer, the accelerometer, and the gyroscope; wherein the orientation data comprises movement and/or vibration data; angular velocity data; and direction data.

In an embodiment, a method for optically detecting a flame, the method comprising positioning an optical flame detector, wherein the optical flame detector comprises a magnetometer, an accelerometer, and a gyroscope; and obtaining, with an information handling system, initial orientation data from the magnetometer, the accelerometer, and the gyroscope; wherein the orientation data comprises movement and/or vibration data; angular velocity data; and direction data.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
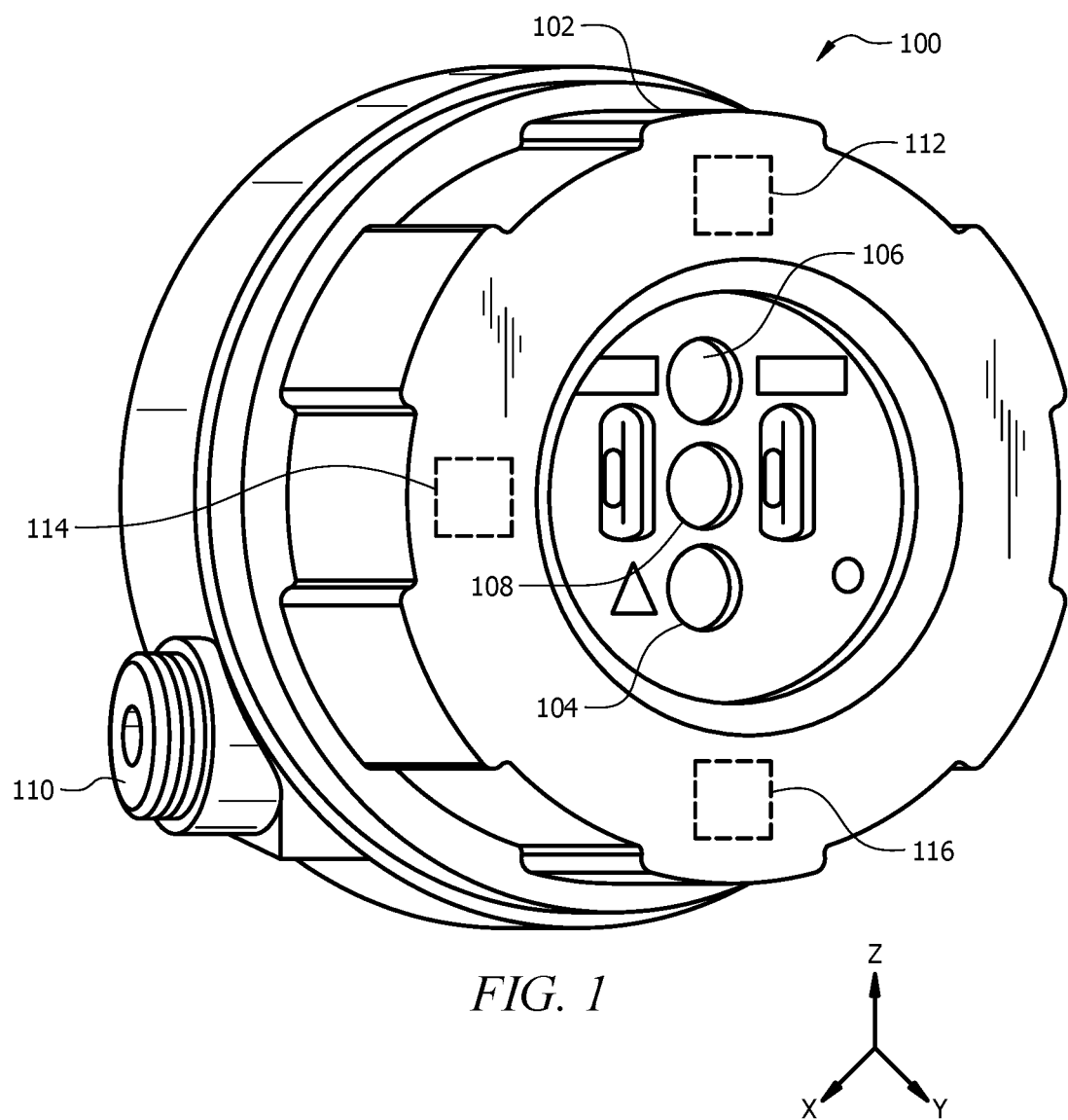
FIG. 1 is a schematic illustration of an optical flame detector in accordance with embodiments of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The following brief definition of terms shall apply throughout the application:

The term "comprising" means including but not limited to, and should be interpreted in the manner it is typically used in the patent context;

The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment);

If the specification describes something as "exemplary" or an "example," it should be understood that refers to a non-exclusive example;

The terms "about" or "approximately" or the like, when used with a number, may mean that specific number, or alternatively, a range in proximity to the specific number, as understood by persons of skill in the art field; and If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

The disclosure may relate to an optical flame detector ("OFD") configured to provide quantifiable feedback regarding an orientation/position of the OFD during installation or operation. OFDs have an effective field of view ("FOV"), and fires within the FOV may be detected, while fires outside the FOV are not likely to be detected. If a physical orientation of an OFD were to change after installation, an intended coverage area by the OFD may not be realized/monitored. Changes/deviations in orientation/position can occur due to an object striking the OFD, movement of the structure the OFD is mounted to, and/or a malfunction of a mounting bracket. During installation of an OFD, a technician may align and aim the OFD to cover an intended area. This process may be manual and subjective. In order to reduce the likelihood of false alarms from sunlight, there may be a recommended installation tilt angle for positioning the OFD. The systems, methods, and/or devices of the disclosure may provide a plurality of quantifiable metrics to assist in the installation process, a technique to continuously monitor orientation parameters for changes, a more cost effective and physically compact solution relative to camera based systems, and meaningful feedback when a camera based solution may be blind (e.g., direct sunlight/complete darkness). Additionally, the systems, methods, and/or devices of the disclosure may indicate (e.g., provide a signal) when there has been a change in orientation/position where a camera based system would likely require an operator to view an image to determine if orientation/position adjustment is required.

FIG. 1 is a schematic illustration of an OFD 100. The OFD 100 may include a FOV from about 100° to about 170° relative to at least one axis (e.g., x-axis, y-axis, z-axis). The OFD 100 may detect flames at a distance ranging from about 0 feet to about 200 feet, relative to the position of the OFD 100. The OFD 100 may detect hydrocarbon and non-hydrocarbon based fires. Operating temperature of the OFD 100 may include about −50° F. to about 200° F. The OFD 100 may have a weight ranging from about 1.5 kilograms to about 4 kilograms.

The OFD 100 may include a housing 102 (e.g., explosion proof housing) which may include an ultraviolet ("UV") light sensor 104, a visible light sensor 106, and an infrared ("IR") sensor 108, and a power port 110 to allow power (e.g., via a power cable/cord) to the OFD 100. The housing 102 may include materials, such as, for example, aluminum and/or stainless steel.

A spectral sensitivity for UV light sensor 104 may range from about 175 nanometers to about 275 nanometers. A spectral sensitivity for visible light sensor 106 may range from about 350 nanometers to about 750 nanometers. A spectral sensitivity for IR sensor 108 may range from about 0.5 micrometers to about 4 micrometers. The housing 102 may also include sensors, such as, accelerometer 112, gyroscope 114, and/or magnetometer 116 (e.g., a compass). A sensitivity for each of the sensors may be adjustable.

An accelerometer 112 may sense/measure movement and/or vibrations of the OFD 100 relative to one, two, or three axes (e.g., x-axis, y-axis, z-axis). The gyroscope 114 may sense/measure angular velocity of the OFD 100 relative to one, two, or three axes (e.g., x-axis, y-axis, z-axis). A magnetometer 116 may measure/sense direction of the OFD 100 relative to one, two, or three axes (e.g., x-axis, y-axis, z-axis). It should be noted that each of the accelerometer 112, the gyroscope 114, and the magnetometer 116 may measure orientation data (e.g., movement and/or vibration data of the OFD 100; angular velocity data of the OFD 100; and direction data of the OFD 100) relative to at least one axis. That is, the Degrees of Freedom ("DOF") (i.e., a number of axes for sensor measurements) for the OFD 100 may range from three DOF through nine DOF.

Figure 2:
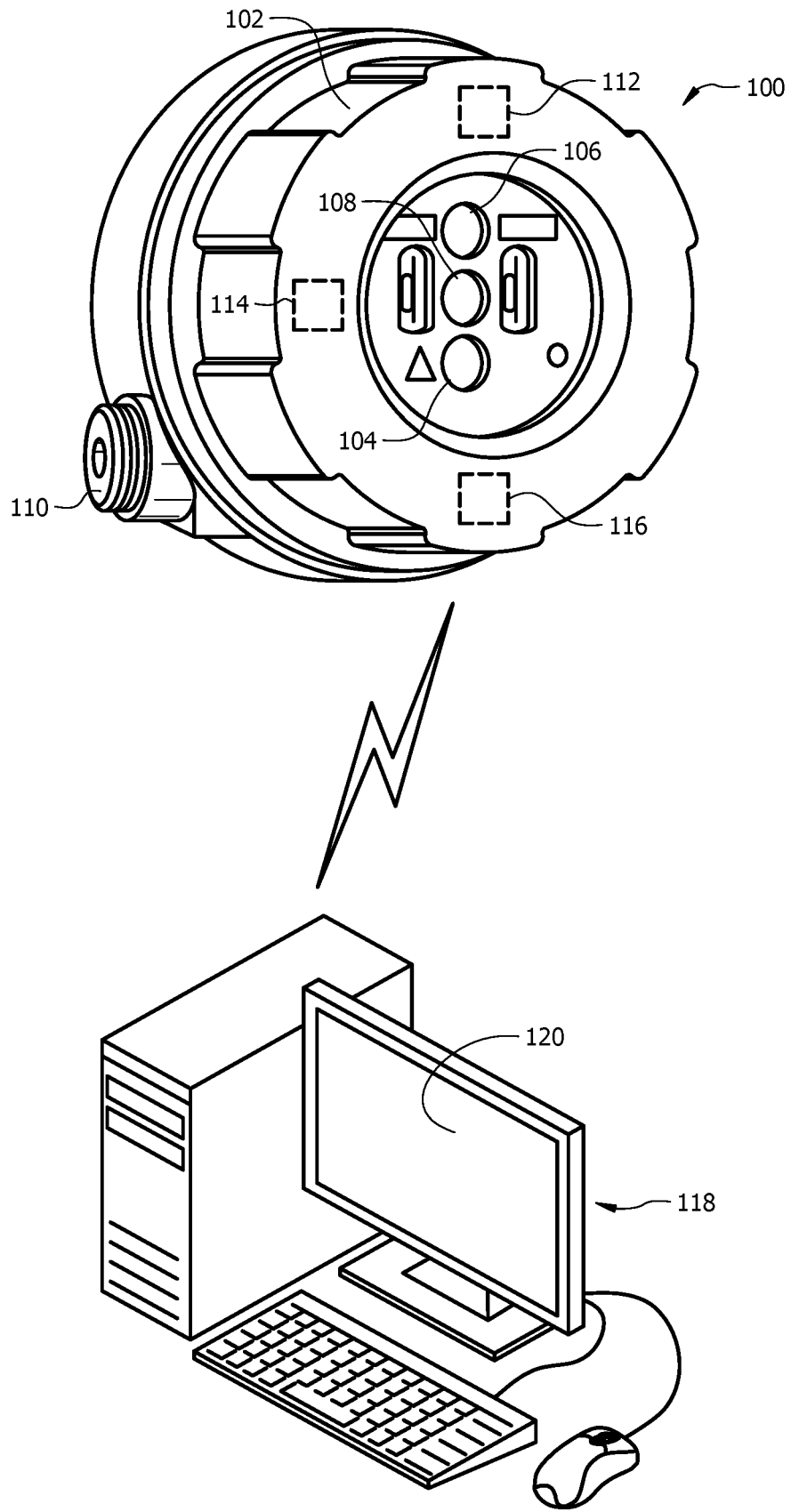
FIG. 2 is a schematic illustration of an optical flame detection system in accordance with embodiments of the disclosure.

With reference to FIG. 2, the OFD 100 may be connected (e.g., wirelessly or wired) to an information handling system (e.g., information handling system 118). The information handling system 118 may communicate with the OFD 100 and may obtain orientation data from the OFD 100. As noted above, orientation data may include data from the accelerometer 112, the gyroscope 114, and the magnetometer 116. The OFD 100 may be re-initialized so that it can have a new initial position/orientation. Re-initialization may be performed, for example, by moving the fire detector to another location in the facility. An external magnet may be placed near or on OFD 100 to cause a transition to an installation or configuration mode.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer or tablet device, a cellular telephone, a network storage device, or any other suitable device and may vary in size, shape, performance, functionality, and price. The information handling system may include random access memory ("RAM"), one or more processing resources such as a central processing unit ("CPU") or hardware or software control logic, read-only memory ("ROM"), and/or other types of nonvolatile memory. Additional components of the information handling system may include one or more disk drives, one or more network ports for communication with external devices as well as various input and output (I/O) devices, such as a keyboard, a mouse, and a video display (e.g., user interface 120). The information handling system also may include one or more buses operable to transmit communications between the various hardware components.

The information handling system may also include computer-readable media. Computer-readable media may include any instrumentality or aggregation of instrumentalities that may retain data and/or instructions for a period of time. Computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory ("EEPROM"), and/or flash memory; as well as communications media such as wires, optical fibers, microwaves, radio waves, and other electromagnetic and/or optical carriers; and/or any combination of the foregoing.

During installation, the OFD 100 may be positioned (e.g., via a mount) on a structure (e.g. a pole, wall, etc.) with an initial orientation (e.g., initial installation orientation). This initial orientation may allow for a desired FOV. The initial orientation of the OFD 100 may be recorded/obtained by information handling system 118. This initial orientation may serve as a baseline in order to detect changes/deviations from the initial orientation/position during operation of the OFD 100. Changes from the baseline may not allow for the desired FOV. For example, an undesired tilt angle (e.g., relative to an x-axis, a y-axis, and/or a z-axis) of the OFD 100 may not allow the OFD 100 to monitor an intended target (e.g., area).

During operation (e.g., scanning an area to detect a flame) of the OFD 100, changes in orientation may be caused by various forces, such as, for example, wind, contact from another object/person, and/or vibrations due to nearby equipment. The information handling system 118 may continuously or periodically measure the orientation of the OFD 100 (via the accelerometer 112, the gyroscope 114, and the magnetometer 116) and compare a present/current orientation of the OFD 100 to the baseline orientation of the OFD 100. The information handling system 118 may quantify and display any changes/deviations (e.g., numerical values) in orientation, and recommend, via the user interface 120, positioning/re-positioning of the OFD 100 to conform to the baseline orientation. The information handling system 118 may also indicate/signal/display that the OFD 100 is in an incorrect position or that the OFD 100 is in a correct position. A correct/incorrect position may be determined (e.g., via information handling system 118) with a pre-determined limit/threshold for deviations from the initial baseline orientation. For example, a deviation within the pre-determined limit may indicate a correct position, whereas, a deviation outside of the pre-determined limit may indicate an incorrect position. An example algorithm for determining a correct/incorrect orientation may compare obtained orientation data to predetermined limits. A technician may use this information to correct the orientation of the OFD 100 to the baseline orientation for desired operation (e.g., desired FOV).

In certain embodiments, the information handling system 118 may recognize that certain movements/orientations detected (via the accelerometer 112, the gyroscope 114, and the magnetometer 116) by the OFD 100 may not indicate an incorrect position. For example, the OFD 100 may be installed on a semi-submersible drilling rig offshore. This floating structure may move due to waves and/or wind. The information handling system 118 may incorporate these movements/deviations into the baseline orientation (e.g., initial orientation) and/or a deviation threshold. For example, the initial position can be set as a range such that the movements are incorporated into baseline orientation and/or the threshold can be set as a higher range when some movements/deviations are expected and/or experienced during the set-up process. These incorporated movements/deviations may not indicate an incorrect position of the OFD 100. That is, information handling system 118 may account/allow for certain deviations/movements in the baseline orientation, thereby, allowing for a correct indication of a position of the OFD 100. There may be movements of the flame detector that should not be considered to be problematic. The use of an accelerometer, gyro, magnetometer located separately may utilize the movement and orientation of the other fire detectors installed. For example, the movement and orientation of the other fire detectors installed on the same platform could be used to determine if any one fire detector has moved with respect to the continuously/periodically monitored reference measurements. The reference orientation/position may be comprised of one or more fire detectors or other measurement devices. There may be some cases where the reference orientation and position is fixed, and there may be some where it is beneficial for it to be relative to a potentially moving reference.

In some embodiments, the information handling system 118 may obtain orientation data from at least one of the accelerometer 112, the gyroscope 114, and/or the magnetometer 116. That is, a user may select, via the information handling system 118, data from at least one of the accelerometer 112, the gyroscope 114, and/or the magnetometer 116 to determine a deviation from a baseline orientation. In other words, not all orientation data from the accelerometer 112, the gyroscope 114, and/or the magnetometer 116 may be utilized (e.g., incorporated into an algorithm) for determining the deviation from the baseline orientation.

Having described various systems and methods, various embodiments can include, but are not limited to:

In a first embodiment, an optical flame detector may comprise a magnetometer; an accelerometer; and a gyroscope; wherein the magnetometer, the accelerometer, and the gyroscope are configured to provide orientation data of the optical flame detector.

A second embodiment may include the optical flame detector of the first embodiment, further comprising an infrared sensor.

A third embodiment may include the optical flame detector of the first or second embodiment, further comprising a visible light sensor.

A fourth embodiment may include the optical flame detector of any of the preceding embodiments, further comprising an ultraviolet light sensor.

A fifth embodiment may include the optical flame detector of any of the preceding embodiments, wherein the orientation data comprises movement and/or vibration data; angular velocity data; and direction data.

A sixth embodiment may include the optical flame detector of any of the preceding embodiments, wherein the magnetometer is configured to measure direction relative to an x-axis, a y-axis, a z-axis, or combinations thereof.

A seventh embodiment may include the optical flame detector of any of the preceding embodiments, wherein the accelerometer is configured to measure movement, tilt angle via measuring gravity, and/or vibration relative to the x-axis, the y-axis, the z-axis, or combinations thereof.

An eighth embodiment may include the optical flame detector of any of the preceding embodiments, wherein the gyroscope is configured to measure angular velocity relative to the x-axis, the y-axis, the z-axis, or combinations thereof.

A ninth embodiment may include the optical flame detector of any of the preceding embodiments, further comprising a housing, wherein the housing comprises aluminum, stainless steel, or combinations thereof; wherein the magnetometer, the accelerometer, the gyroscope, the ultraviolet sensor, the visible light sensor, and the infrared sensor are positioned within the housing.

A tenth embodiment may include the optical flame detector of any of the preceding embodiments, wherein the ultraviolet sensor, the visible light sensor, and the infrared sensor are configured to detect flames at a distance ranging from about 0 feet to about 200 feet.

In an eleventh embodiment, a system for optically detecting a flame, the system comprising an optical flame detector, wherein the optical flame detector comprises a magnetometer, an accelerometer, and a gyroscope; and an information handling system, wherein the information handling system is configured to obtain orientation data from the magnetometer, the accelerometer, and the gyroscope; wherein the orientation data comprises movement and/or vibration data; angular velocity data; and direction data.

A twelfth embodiment may include the system of the eleventh embodiment, wherein the information handling system is connected to the optical flame detector via a wireless connection or a wired connection; and wherein the information handling system is configured to detect an initial installation orientation of the optical flame detector. Indicators such as light emitting diodes ("LEDs") may also be used to indicate a "ready" or "not ready" status for the optical flame detector.

A thirteenth embodiment may include the system of the eleventh or twelfth embodiments, wherein the information handling system is configured to detect a deviation from the initial installation orientation of the optical flame detector.

A fourteenth embodiment may include the system of any one of the eleventh through thirteenth embodiments, wherein the information handling system is configured to recommend an initial downward tilt angle with respect to a stored value. The stored value may assist in an initial installation of the optical flame detector.

A fifteenth embodiment may include the system of any one of the eleventh through fourteenth embodiments, wherein the information handling system is configured to indicate whether the initial downward tilt angle of the optical flame detector is correct or incorrect based on the deviation from the stored value.

In a sixteenth embodiment, a method for optically detecting a flame, the method comprising positioning an optical flame detector, wherein the optical flame detector comprises a magnetometer, an accelerometer, and a gyroscope; and obtaining, with an information handling system, initial orientation data from the magnetometer, the accelerometer, and the gyroscope; wherein the orientation data comprises movement and/or vibration data; angular velocity data; and direction data.

A seventeenth embodiment may include the method of the sixteenth embodiment, further comprising detecting, with the information handling system, a deviation from the initial orientation data.

An eighteenth embodiment may include the method of the sixteenth or seventeenth embodiment, further comprising recommending, with the information handling system, a position for the optical flame detector based on a sensed gravity direction (e.g., utilizing an accelerometer as a tilt meter to establish an initial orientation).

A nineteenth embodiment may include the method of any one of the sixteenth through eighteenth embodiments, further comprising indicating, with the information handling system, whether the position of the optical flame detector is correct or incorrect based on the deviation from the initial orientation data.

A twentieth embodiment may include the method of any one of the sixteenth through nineteenth embodiments, further comprising determining, with the information handling system, whether the deviation is within a predetermined limit.

A twenty first embodiment may include the method of any one of the sixteenth through twentieth embodiments, further comprising incorporating, with the information handling system, the deviation into the initial orientation data.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow that scope including all equivalents of the subject matter of the claims. Each and every claim is incorporated as further disclosure into the specification and the claims are embodiment(s) of the present invention(s). Furthermore, any advantages and features described above may relate to specific embodiments, but shall not limit the application of such issued claims to processes and structures accomplishing any or all of the above advantages or having any or all of the above features.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure. Specifically and by way of example, although the headings might refer to a "Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a limiting characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of the claims shall be considered on their own merits in light of this disclosure, but should not be constrained by the headings set forth herein.

Use of broader terms such as "comprises," "includes," and "having" should be understood to provide support for narrower terms such as "consisting of," "consisting essentially of" and "comprised substantially of" Use of the terms "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. An information handling system for optically detecting a flame, the information handling system comprising:
    an optical flame detector, wherein the optical flame detector comprises a magnetometer, an accelerometer, a gyroscope, a memory device, and a processor,
    the memory device configured to store one or more instructions; and
    the processor coupled to the memory device, wherein the processor is configured to execute the one or more instructions to:
        obtain a first orientation data from the magnetometer, the accelerometer, and the gyroscope, positioned within a housing in the optical flame detector, wherein the first orientation data comprises movement and/or vibration data, angular velocity data, and direction data;
        obtain a reference orientation data from at least one of fire detectors, the magnetometer, the accelerometer or the gyroscope, installed on a same platform as the optical flame detector, wherein the fire detectors are different from the optical flame detector, and wherein the reference orientation data comprises movement and/or vibration data, angular velocity data, and direction data;
        determine a deviation between the first orientation data and the reference orientation data based at least on a comparison between the reference orientation data and the first orientation data; and determine whether one or more of the fire detectors or the optical flame detector has moved with respect to periodically monitored reference measurements.

2. The information handling system of claim 1, wherein the information handling system is connected to the optical flame detector via a wireless connection or a wired connection; and wherein the information handling system is configured to detect an initial installation orientation of the optical flame detector; and to detect a deviation of the obtained first orientation data is within a predetermined limit of the initial installation orientation of the optical flame detector.

3. The information handling system of claim 1, wherein the optical flame detector comprises at least one of an infrared sensor, a visible light sensor or an ultraviolet light sensor, positioned within the housing, wherein the at least one of the infrared sensor, the visible light sensor or the ultraviolet light sensor are configured to detect flames within a defined distance range.

4. The information handling system of claim 1, wherein the magnetometer is configured to measure direction relative to an x-axis, a y-axis, a z-axis, or combinations thereof.

5. The information handling system of claim 1, wherein the accelerometer is configured to measure movement and/or vibration relative to an x-axis, a y-axis, a z-axis, or combinations thereof.

6. The information handling system of claim 1, wherein the gyroscope is configured to measure angular velocity relative to an x-axis, a y-axis, a z-axis, or combinations thereof.

7. The information handling system of claim 1, wherein the information handling system is configured to:
   recommend, via a user interface, a position of the optical flame detector based on an initial orientation data; and
   indicate, via the user interface, whether the recommended position of the optical flame detector is correct or incorrect based on a deviation from the initial orientation data.

8. A method for optically detecting a flame, the method comprising:
   positioning an optical flame detector, wherein the optical flame detector comprises a magnetometer, an accelerometer, and a gyroscope;
   obtaining, with an information handling system, initial orientation data, corresponding to the optical flame detector, from the magnetometer, the accelerometer, and the gyroscope, wherein the initial orientation data comprises movement and/or vibration data; angular velocity data; and direction data;
   obtaining a first orientation data from the optical flame detector, wherein the first orientation data is measured by the magnetometer, the accelerometer, and the gyroscope, positioned within a housing, in the optical flame detector;
   obtaining a reference orientation data from fire detectors installed on a same platform as the optical flame detector, wherein the fire detectors are different from the optical flame detector;
   determining a deviation between the first orientation data and the reference orientation data based at least on a comparison between the reference orientation data and the first orientation data; and
   determining whether one or more of the fire detectors or the optical flame detector has moved with respect to periodically monitored reference measurements.

9. The method of claim 8, further comprising detecting, with the information handling system, a deviation between the first orientation data from the initial orientation data.

10. The method of claim 9, further comprising recommending, with the information handling system, a position for the optical flame detector based on the deviation from the initial orientation data.

11. The method of claim 10, further comprising determining, with the information handling system, whether the deviation is within a predetermined limit.

12. The method of claim 8, further comprising:
   recommending, via a user interface, a position of the optical flame detector based on the initial orientation data; and
   indicating, via the user interface, whether the recommended position of the optical flame detector is correct or incorrect based on the deviation from the initial orientation data.

* * * * *